United States Patent
Vis et al.

(10) Patent No.: US 11,531,808 B2
(45) Date of Patent: Dec. 20, 2022

(54) INTELLIGENT DOCUMENT NOTIFICATIONS BASED ON USER COMMENTS

(71) Applicant: GOOGLE LLC, Mountain View, CA (US)

(72) Inventors: Timothy Vis, Firestone, CO (US); Jesse Sterr, Eerie, CO (US); Michael Colagrosso, Arvada, CO (US); Michael Procopio, Boulder, CO (US); Sandor Dornbush, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/043,612

(22) PCT Filed: Aug. 21, 2018

(86) PCT No.: PCT/US2018/047365
§ 371 (c)(1),
(2) Date: Sep. 29, 2020

(87) PCT Pub. No.: WO2020/023065
PCT Pub. Date: Jan. 30, 2020

(65) Prior Publication Data
US 2021/0142000 A1    May 13, 2021

Related U.S. Application Data

(60) Provisional application No. 62/702,254, filed on Jul. 23, 2018.

(51) Int. Cl.
*G06F 3/048* (2013.01)
*G06F 40/169* (2020.01)
(Continued)

(52) U.S. Cl.
CPC .......... *G06F 40/169* (2020.01); *G06F 3/0481* (2013.01); *G06F 16/24578* (2019.01);
(Continued)

(58) Field of Classification Search
CPC ....... H04L 51/22; H04L 51/046; H04L 67/10; G06F 3/0481; G06F 16/24578; G06F 40/169; G06N 20/00
See application file for complete search history.

(56) References Cited

U.S. PATENT DOCUMENTS

| 8,374,975 B1 | 2/2013 | Cierniak et al. |
| 8,661,031 B2 * | 2/2014 | Chandra ............... G06F 16/951 707/730 |

(Continued)

OTHER PUBLICATIONS

PCT International Search Report and Written Opinion for International Application No. PCT/US2018/047365, dated Apr. 5, 2019, 15 pages.

*Primary Examiner* — Rashawn N Tillery
(74) *Attorney, Agent, or Firm* — Lowenstein Sandler LLP

(57) ABSTRACT

A method of notifying a user of a cloud-based content management platform of a comment made in a document associated with the user includes determining a set of comments associated with documents to which the user has access via the cloud-based content management platform, the set of comments including one or more comments added by other users to each document within a last predetermined time period, selecting one or more comments from the set of comments for notification to the user, the selecting being based at least on interactions of the user with a comment thread associated with each comment from the set of comments and characteristics of the comment thread, wherein a comment thread is a group of a plurality of comments comprising a first comment and a second comment added in reply to the first comment, determining one or more docu- (Continued)

ments associated with the one or more selected comments, and providing a graphical user interface (GUI) of a cloud storage of the user hosted by the cloud-based content management platform for presentation to the user, the GUI identifying the one or more documents and, for each identified document, a respective selected comment associated with the identified document.

21 Claims, 8 Drawing Sheets

(51) Int. Cl.
  G06N 20/00 (2019.01)
  G06F 16/2457 (2019.01)
  G06F 3/0481 (2022.01)
  H04L 67/10 (2022.01)
  H04L 51/046 (2022.01)
  H04L 51/42 (2022.01)

(52) U.S. Cl.
  CPC ............. G06N 20/00 (2019.01); H04L 67/10 (2013.01); *H04L 51/046* (2013.01); *H04L 51/42* (2022.05)

(56) References Cited

U.S. PATENT DOCUMENTS

| | | | |
|---|---|---|---|
| 8,745,067 B2 * | 6/2014 | Cierniak | G06F 16/22 |
| | | | 707/749 |
| 10,282,424 B2 * | 5/2019 | Zholudev | G06Q 30/02 |
| 2011/0014521 A1 | 6/2011 | Cierniak et al. | |
| 2011/0208750 A1 | 8/2011 | Miyazaki | |
| 2012/0030553 A1 * | 2/2012 | Delpha | G06F 40/169 |
| | | | 715/205 |
| 2014/0028023 A1 | 9/2014 | Faller et al. | |
| 2017/0034107 A1 | 2/2017 | Krishnaswamy | |
| 2017/0139919 A1 * | 5/2017 | Ball | G06F 16/248 |
| 2018/0300412 A1 * | 10/2018 | Devries | G06F 16/958 |
| 2020/0218719 A1 * | 7/2020 | Eifert | G06F 16/24578 |

* cited by examiner

INTELLIGENT DOCUMENT NOTIFICATIONS BASED ON USER COMMENTS

TECHNICAL FIELD

Aspects and implementations of the present disclosure relate to a cloud-based content management platform, and more specifically, to a notification from the cloud-based content management platform.

BACKGROUND

A cloud-based content management platform provides a cloud storage for storing documents and editing applications (e.g. word processor, presentation, and spreadsheet applications) for collaborative editing of the documents. Accordingly, users of the cloud-based content management platform can collaborate over a network to create and store documents in the cloud storage and edit, comment upon, or share the documents. A user would first access documents associated with the user account via a home screen provided by the cloud-based content management platform. From the home screen, the user can locate one of the documents and access the located document. The cloud-based content management platform can additionally provide one or more applications such as an online calendar, an email, and a messenger application. Thus, the users can schedule meetings for a project and communicate with each other over emails or instant messages to facilitate online collaboration.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for notifying a user of a cloud-based content management platform of a change in state, or of a comment made in an electronic document associated with the user. In an implementation, a set of comments associated with documents to which the user has access via the cloud-based content management platform is determined. The set of comments includes one or more comments added by other users to each document within a last predetermined time period. One or more comments from the set of comments for notification to the user are selected. The selection is based at least on interactions of the user with a comment thread associated with each comment from the set of comments, and characteristics of the comment thread. A comment thread is a group of a plurality of comments comprising a first comment and a second comment added in reply to the first comment. One or more documents associated with the one or more selected comments are determined. A graphical user interface (GUI) of a cloud storage of the user hosted by the cloud-based content management platform for presentation to the user is provided. The GUI identifies the one or more documents. For each identified document, a respective selected comment is associated with the identified document.

When the GUI identifying the one or more electronic documents and the respective selected comment(s) is presented to the user, the user may provide, via the GUI, one or more inputs relating to one or more of the documents and/or comments identified in the GUI, thereby enabling a continuous interaction between the user and the documents stored in the cloud-based content management platform.

The present disclosure provides a method of notifying a user of a cloud-based content management platform of a comment made in a document associated with the user. The method may comprise determining, by a processor, a set of comments associated with documents to which the user has access via the cloud-based content management platform. The set of comments may include one or more comments added by other users to each document within a last predetermined time period. The method may comprise selecting, by the processor, one or more comments from the set of comments for notification to the user. The selecting may be based at least on interactions of the user with a comment thread associated with each comment from the set of comments and characteristics of the comment thread. A comment thread may be a group of a plurality of comments comprising a first comment and a second comment added in reply to the first comment. The method may comprise determining, by the processor, one or more documents associated with the one or more selected comments. The method may comprise providing, by the processor, a graphical user interface GUI of a cloud storage of the user hosted by the cloud-based content management platform for presentation to the user, the GUI identifying the one or more documents and, for each identified document, a respective selected comment associated with the identified document.

The selecting of the one or more comments from the set of comments may comprise, for each comment in the set of comments, determining a comment thread associated with a respective comment; determining the interactions of the user with the comment thread; and determining the characteristics of the comment thread. The selecting of the one or more comments from the set of comments may further comprise determining a comment score for the respective comment based at least on the interactions of the user with the comment thread and the characteristics of the comment thread; ranking each comment in the set of comments based on the comment scores; and selecting the one or more comments from the set of comments based on rankings.

The determining of the interactions of the user with the comment thread associated with each comment from the set of comments may include determining at least one of: whether the user has added an initial comment in the comment thread; and/or whether the user has added a comment as a reply to the initial comment or another comment in the comment thread.

The determining of the characteristics of the comment thread associated with the respective comment may include determining at least one of: a status of the comment thread, the status including an open status or a close status; a number of comments included in the comment thread; a number of different users involved in the comment thread; a proportion of comments in the comment thread that are added by the user; a proportion of comments in the comment thread that are added by other users; and/or a length of time period the comment thread remained open.

The determining of the comment score for the respective comment may be further based on an importance weight assigned to each user who added the one or more comments. The importance weight is determined based on an importance of the respective user who generated the one or more comments in a social network associated with the cloud-based content management platform.

The determining of the comment score for the respective comment based on the interactions of the user with the comment thread, characteristics of the comment thread, and the importance weight assigned to each user who added the one or more comments may comprise: providing the interactions of the user with the comment thread, characteristics of the comment thread, and the importance weight assigned to each user who added the one or more comments as an input to a machine learning model; and obtaining an output from the machine learning model, the output indicating a probability of the user being interested in the respective comment.

The determining of the one or more documents associated with the one or more selected comments may comprise: identifying a set of documents, each document being associated with at least one of the one or more selected comments; determining a document score for each document based on the comment scores of the one or more selected comments; ranking each document in the set of documents based on the document scores; and selecting the one or more documents from the set of documents based on rankings.

The determining of the document score for each document based on the comment scores of the one or more selected comments may comprise: identifying a set of comment threads, each comment thread being associated with at least one of the one or more selected comments; determining a comment thread score for each comment thread in the set of comment threads based on the comment score of one or more selected comments associated with a respective comment thread; and determining the document score for each document based on a comment thread score of one or more comment threads associated with a respective document.

The respective selected comment associated with the identified document may correspond to a most recent comment or a comment with a highest importance score amongst one or more comments associated with a respective identified document. The GUI may comprise one or more suggestion cards. Each suggestion card may identify a respective document, e.g. each of the one or more documents. Each suggestion card may identify a respective comment. Each suggestion card may comprise at least one of: a title information including a document type and a title of a respective document; an image representation of the respective document; a first intelligent button to reply to the respective comment from a respective suggestion card without opening the respective document; a second intelligent button to close the respective comment from the respective suggestion card without opening the respective document; a comment text including content of the respective comment; and a reason text describing a reason for the selection of the respective comment.

The present disclosure provides a system comprising a memory device; and a processing device operatively coupled to the memory device. The processing device may be configured to: determine a set of comments associated with documents to which the user has access via the cloud-based content management platform, the set of comments including one or more comments added by other users to each document within a last predetermined time period; select one or more comments from the set of comments for notification to the user, the selecting being based at least on interactions of the user with a comment thread associated with each comment from the set of comments and characteristics of the comment thread, wherein a comment thread is a group of a plurality of comments comprising a first comment and a second comment added in reply to the first comment; determine one or more documents associated with the one or more selected comments; and provide a GUI of a cloud storage of the user hosted by the cloud-based content management platform for presentation to the user, the GUI identifying the one or more documents and, for each identified document, a respective selected comment associated with the identified document.

To select the one or more comments from the set of comments, the processing device may be further configured to: for each comment in the set of comments: determine a comment thread associated with a respective comment; determine the interactions of the user with the comment thread; and determine the characteristics of the comment thread; determine a comment score for the respective comment based at least on the interactions of the user with the comment thread and the characteristics of the comment thread; rank each comment in the set of comments based on the comment scores; and select the one or more comments from the set of comments based on rankings.

To determine the one or more documents associated with the one or more selected comments, the processing device may be further configured to: identify a set of documents, each document being associated with at least one of the one or more selected comments; determine a document score for each document based on the comment scores of the one or more selected comments; rank each document in the set of documents based on the document scores; and select the one or more documents from the set of documents based on rankings.

To determine the document score for each document based on the comment scores of the one or more selected comments, the processing device may be further configured to: identify a set of comment threads, each comment thread being associated with at least one of the one or more selected comments; determine a comment thread score for each comment thread in the set of comment threads based on the comment score of one or more selected comments associated with a respective comment thread; and determine the document score for each document based on a comment thread score of one or more comment threads associated with a respective document.

The GUI may comprise one or more suggestion cards. Each suggestion card may identify respective documents, e.g. each of the one or more documents. Each suggestion card may identify a respective comment. Each suggestion card may comprise at least one of: a title information including a document type and a title of a respective document; an image representation of the respective document; a first intelligent button to reply to the respective comment from a respective suggestion card without opening the respective document; a second intelligent button to close the respective comment from the respective suggestion card without opening the respective document; a comment text including content of the respective comment; and a reason text describing a reason for the selection of the respective comment.

The present disclosure provides a non-transitory, computer readable medium storing instructions that, when executed, cause a processing device to: determine a set of comments associated with documents to which the user has access via the cloud-based content management platform, the set of comments including one or more comments added by other users to each document within a last predetermined time period; select one or more comments from the set of comments for notification to the user, the selecting being based at least on interactions of the user with a comment thread associated with each comment from the set of comments and characteristics of the comment thread, wherein a comment thread is a group of a plurality of comments comprising a first comment and a second comment added in reply to the first comment; determine one or more documents associated with the one or more selected comments; and provide a GUI of a cloud storage of the user hosted by the cloud-based content management platform for presentation to the user, the GUI identifying the one or more documents and, for each identified document, a respective selected comment associated with the identified document.

The instructions, when executed, to select the one or more comments from the set of comments, may cause the processing device to: for each comment in the set of comments: determine a comment thread associated with a respective comment; determine the interactions of the user with the comment thread; and determine the characteristics of the comment thread. The instructions, when executed, to select the one or more comments from the set of comments, may cause the processing device to: determine a comment score for the respective comment based at least on the interactions of the user with the comment thread and the characteristics of the comment thread; rank each comment in the set of comments based on the comment scores; and select the one or more comments from the set of comments based on rankings.

The instructions, when executed, to determine the comment thread associated with the respective comment, may cause the processing device to: determine at least one of: whether the user has added an initial comment in the comment thread; or whether the user has added a comment as a reply to the initial comment or another comment in the comment thread; and wherein to determine of the characteristics of the comment thread associated with the respective comment, the processing device further to: determine at least one of: a status of the comment thread, the status including an open status or a close status; a number of comments included in the comment thread; a number of different users involved in the comment thread; a proportion of comments in the comment thread that are added by the user; a proportion of comments in the comment thread that are added by other users; and/or a length of time period the comment thread remained open.

The instructions, when executed, to determine the one or more documents associated with the one or more selected comments, may cause the processing device to: identify a set of documents, each document being associated with at least one of the one or more selected comments; determine a document score for each document based on the comment scores of the one or more selected comments; rank each document in the set of documents based on the document scores; and select the one or more documents from the set of documents based on rankings.

The instructions, when executed, to determine the document score for each document based on the comment scores of the one or more selected comments, may cause the processing device to: identify a set of comment threads, each comment thread being associated with at least one of the one or more selected comments; determine a comment thread score for each comment thread in the set of comment threads based on the comment score of one or more selected comments associated with a respective comment thread; and determine the document score for each document based on a comment thread score of one or more comment threads associated with a respective document.

The GUI may comprise one or more suggestion cards. Each suggestion card may identify a respective document, e.g. each of the one or more documents, and may identify a respective comment. Each suggestion card may comprise at least one of: a title information including a document type and a title of a respective document; an image representation of the respective document; a first intelligent button to reply to the respective comment from a respective suggestion card without opening the respective document; a second intelligent button to close the respective comment from the respective suggestion card without opening the respective document; a comment text including content of the respective comment; and a reason text describing a reason for the selection of the respective comment.

In some other implementations, a system and method are disclosed for notifying a document to a user of a cloud-based content management platform. A first set of documents is identified. The first set of documents is hosted by the cloud-based content management platform and does not include one or more documents recently opened by the user. One or more target documents from the first set of documents for the user are identified based on an amount of overlap in topicality between a respective document and a user's current working set of documents, a number of view events of the respective document, and a number of collaborative events associated with the respective document. The user's current working set of documents comprises documents the user has accessed within a last predetermined time period via the cloud-based content management platform. A graphical user interface (GUI) of a cloud storage of the user hosted by the cloud-based content management platform for presentation to the user is provided. The GUI identifies the one or more target documents.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
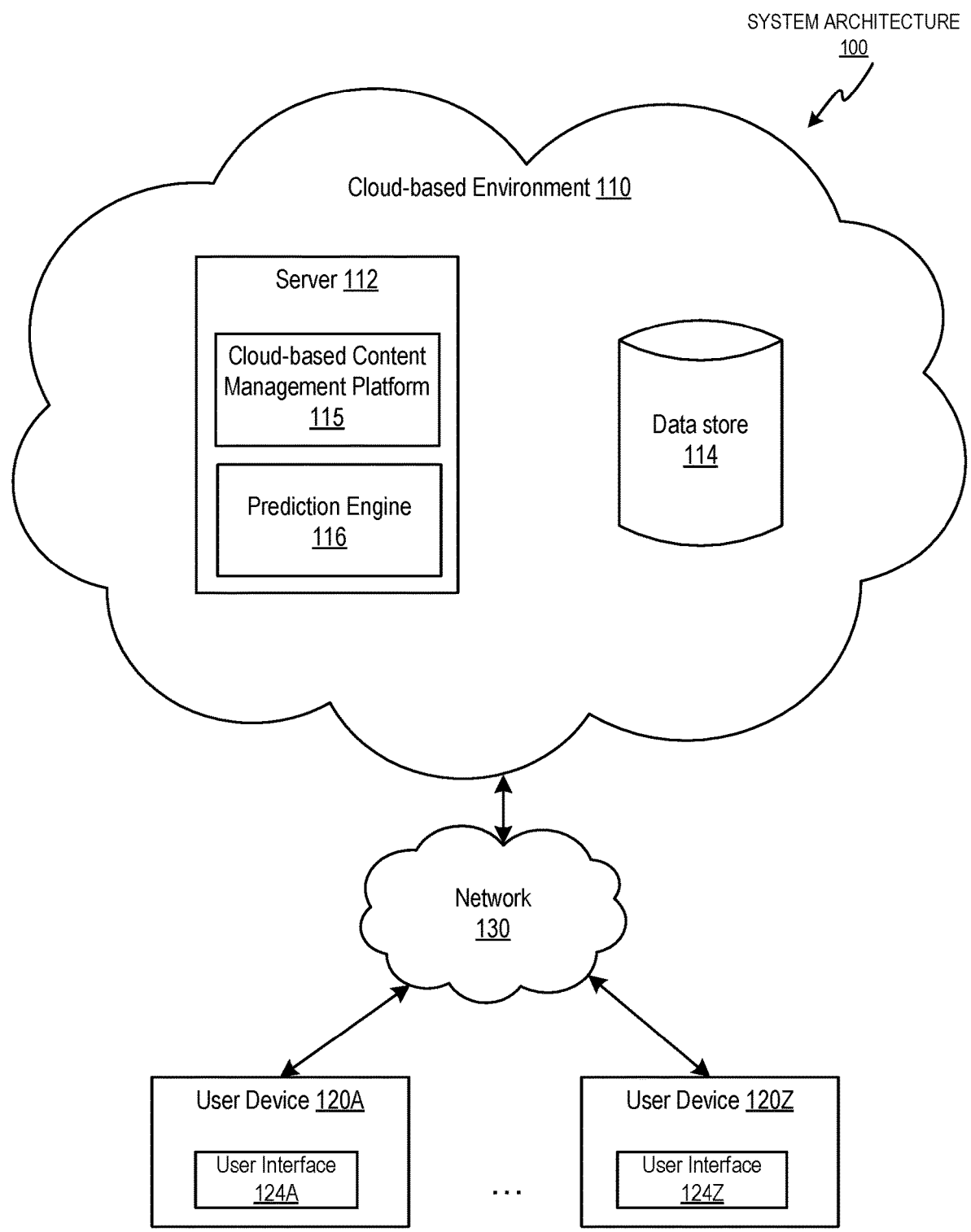
FIG. 1 illustrates an example of a system architecture implementing some aspects of the present disclosure.

A cloud-based content management platform may provide a cloud storage for electronic documents, as well as editing applications such as a word processor, presentation, and spreadsheet applications, among other things. A user may log into the cloud-based content management platform, and be presented with a home screen of the cloud-based content management platform. A home screen used herein refers to a graphical user interface (GUI) that lists documents associated with a user account that are stored in the cloud storage. A cloud storage used herein refers to a repository of online electronic documents associated with the user account. Such documents may include documents owned or created by the user and/or one or more groups the user is a member of, and/or documents shared with the user and/or one or more user groups. The user may select a document from the home screen and access documents using an editing application provided by the cloud-based content management platform. To access a document as used herein refers to an opening, viewing, editing, or adding a comment to the document, among other things. A comment used herein refers to a post added to a specific portion of a document, a post added in association with a suggested edit on a portion of the document, or a post added to assign a task to the user in association with a specific portion of the document, among other things.

As more users collaborate via the cloud-based content management platform, a number of documents being stored in the cloud storage has exponentially grown. Accordingly, the user may need to spend a significant amount of time to locate and retrieve, from the home screen of the cloud-based content management platform, a document in which the user is interested. Moreover, the user may even forget about documents the user has previously opened or needs, or the user may not be fully aware of all the documents available to the user. This is particularly acute in collaborative working systems where multiple users can potentially create, edit, share, or comment on documents, and where the number of documents that cloud-based content management platform may be so vast that a user may only be aware of a small proportion of the documents available.

Aspects and implementations of the present disclosure address the above deficiencies, among others, by predicting documents that are likely to be of interest to the user among documents associated with the user account. The documents associated with the user account refer to documents that can be accessed and/or viewed by the user. The prediction technique of the present disclosure may predict a document containing a comment thread that may be of interest to the user because of a comment recently added to the comment thread. The prediction technique may consider the user's interaction with the comment thread and characteristics of the comment thread. Moreover, the prediction technique of the present disclosure may predict a serendipitous document. The serendipitous document as used herein is referred to a document that has not been recently accessed or viewed by the user (i.e., the user may not know about (e.g. because the user has not previously accessed that document) or no longer remember about such a document (e.g. because it has been longer than a determined or predetermined period of time since the user last interacted with that document)) and is likely to be of interest to the user. The serendipitous document may also be referred to as a target document. To predict the target or serendipitous document, the prediction technique may consider a level of relatedness of the document to documents the user is working on, a level of popularity of the document among other users, and/or a level of collaboration involving the document. The prediction technique may be implemented using a heuristics approach or a machine learning approach, among other things.

Aspects and implementations of the present disclosure also address the above deficiencies by notifying the user about the predicted documents with GUI components that explain a reason for the notification and provide a quick access to the document. The notification technique of the present disclosure may generate a suggestion card for each predicted document (a GUI component presenting information about a respective document). The notification technique may involve extracting a reason for the prediction and inserting the reason in the suggestion card. In addition, the notification technique may provide a user interface component, such as an intelligent button, for the user to quickly access the document.

Accordingly, aspects and implementations of the present disclosure provide the user with a quick access to documents likely to be of interested to the user. As a result, the need for time-consuming searching is eliminated thereby reducing the processing and network resources used for the searching.

A technical problem which may be addressed by aspects and implementations of the present disclosure is that the continued growth in the number of documents accessible by the user via the cloud-based content management platform over a computer network has made the process of locating and retrieving a document more resource intensive. For example, locating a particular document in a cloud storage may involve a user manually reviewing a large corpus of documents until the desired document is found. This may result in an inefficient use of network resources and processing resources. For example, network resources may be consumed by transferring each document in the corpus from the cloud storage to a user device, whereupon processing resources may be consumed by opening each document at the user device to allow manual review by the user. This may be a particular problem in the case of a mobile user device with constrained network and/or processing resources.

A further technical problem is that the content of a document is not fixed but can change over time so that, even if the user is aware of the existence of a particular document, they cannot be sure what the document contains, and if the content of the document can be of interest to the user. Even if the user has previously accessed the document, they do not know whether the current content of the document is the same as the content when they last accessed the document. This means that a user may have to retrieve and access a document in order to see whether the content of the document has been modified since they last accessed it and whether the current content is still of interest to the user, and this again requires use of network and processing resources (which are wasted if, for example, there has been no significant change in the document since the user last accessed the document).

To address the above identified technical problems, aspects and implementations of the present disclosure may notify a user about a document that may be of interest to the user, without requiring explicit actions by the user. This may significantly reduce the network resources and processing resources needed to locate and retrieve documents from a cloud storage. Also, this may provide a user with notifications about, for example, the state, and/or about changes in state, of electronic documents stored in the cloud storage. Alternatively, or additionally, aspects and implementations of the present disclosure may provide a limited number of notifications (i.e., suggestion cards) thereby reducing an amount of network and processing resources required in sending the notifications. Alternatively, or additionally, aspects and implementations of the present disclosure may allow a user to more easily and reliably locate a particular document of interest, thereby significantly reducing the network bandwidth and processing resources required in retrieving documents from the cloud-based storage.

Aspects and implementations of the present disclosure may notify the user regarding documents only to an extent that it is predicted that they may be of interest to the user. This may reduce the resources required to send notifications, at least compared to a case in which the user is notified about every document event, and may result in a more user-friendly or less-intrusive user interface.

Therefore, aspects and implementations of the present disclosure reduce or save computing resources and network bandwidth required by a document search while at the same time providing the user with a wider range of documents than a conventional search engine is able to provide.

FIG. 1 illustrates an example of a system architecture 100 implementing some aspects of the present disclosure.

The system architecture 100 includes a cloud-based environment 110 connected to user devices 120A-120Z via a network 130. The cloud-based environment 110 refers to a collection of physical machines that host applications providing one or more services (e.g., content management) to multiple user devices 120A-120Z via a network 130. The network 130 may be public networks (e.g., the Internet), private networks (e.g., a local area network (LAN) or wide area network (WAN)), or a combination thereof. The network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, the network 130 may include a wired infrastructure (e.g., Ethernet).

The cloud-based environment 110 may include a server 112 and a data store 114. The data store 114 may be separate from the server 112 and communicatively coupled to the server 112, or the data store 114 may be part of the server 112. In some embodiments, the data store 114 may be included as part of the user devices 120A-120Z. The data store 114 may include a cloud storage storing documents for each user. The data store 114 may store metadata associated with documents stored in the cloud storage. Such metadata may include an access control list of users (e.g., who the creator or owner is, who can view and edit, who has been shared with the document) and events associated with the document. An event used herein refers to a user activity incurred to access a document (e.g., an open event, view event, edit event, or a comment event). For each event, the data store 114 may store metadata associated with the event, such as a type of the event, creator of the event, content, and a timestamp. For a comment event, the data store 114 may additionally store information about an associated comment thread. A comment thread is a group of a plurality of comments having a first comment and a second comment added in reply to the first comment. Some examples of such information includes a number of comments in the thread, users associated with each comment in the comment thread, status of the comment thread (e.g., open, close, if open, opened for how long), and a relationship between comments in the comment thread (e.g., which comment is an initial comment that started the comment thread and which comment is a reply to which comment.) The data store 114 may also store a prediction scenario model and its output as explained in details below with respect to the prediction engine 116.

The server 112 may comprise physical machines (e.g., server machines, desktop computers, etc.) that include one or more processing devices communicatively coupled to memory devices and input/output (I/O) devices. The server 112 may host a cloud-based content management platform 115 and may include one or more processing devices. In alternative implementations, the cloud-based content management platform 115 may be hosted by the user devices 120A-120Z (e.g., as standalone applications) and operate as peers in a peer-to-peer environment. In yet alternative implementations, applications on the user devices 120A-120Z may interact with the cloud-based content management platform 115 and may perform some of the functionality of the content management platform 115.

The cloud-based content management platform 115 may enable a user to access documents and view a home screen user interface (UI) of the cloud-based content management platform as a respective UI 124A-124Z. Additionally, in some embodiments, the cloud-based content management platform 115 may provide a UI 124A-124Z that includes suggestion cards 200 to notify the user of documents to be of interest to the user. The cloud-based content management platform 115 may further provide the suggestion card 200 to enable the user to quickly access documents or perform an action to a document without opening the document.

In an implementation, the UIs 124A-124Z of the cloud-based content management platform 115 may be web pages rendered by a web browser and displayed on the user device 120A-120Z in a web browser window. In another implementation, the UIs 124A-124Z may be provided by a mobile application or a desktop application. For example, the UIs 124A-124Z may be displayed by a native application executing on the user device 120A-120Z. The native application may be separate from a web browser.

The server 112 includes a prediction engine 116 to predict documents to be suggested to the user and to notify the user about these documents. In an implementation, the prediction engine 116 may use a prediction scenario model to determine documents to be suggested to the user. The prediction engine 116 may adopt a heuristics approach or a machine learning approach to implement the prediction scenario model as discussed in details with relation to FIGS. 3-5.

A prediction scenario model may be a model for predicting a document or an event the user is likely to be interested in being notified about. The prediction engine 116 may utilize a plurality of prediction scenario models in predicting which document or event the user should be notified about. Some examples of prediction scenario models may pertain to a routine, target or serendipitous document discovery, and/or comments. Each prediction scenario model may be tailored to a particular scenario. For example, the prediction scenario model based on the routine document discovery may be designed to predict a document under a scenario that a user routinely accesses documents via the cloud-based content management platform 115. In such a case, the prediction engine 116 may obtain an output from the prediction scenario model based on the routine document discovery, having a higher probability for documents that are frequently and recently accessed by the user than other documents that are less frequently and recently accessed by the user. The prediction scenario model based on target or serendipitous discovery may operate under a scenario that the user is not aware of or has forgotten about documents (i.e., target or serendipitous documents) that may be helpful to the user because there are too many documents available via the cloud-based content management platform 115. Documents that may be helpful to the user may include documents that are related to documents the user has been currently working on, that collaborators' of the user have recently worked on, and that are popular among other users. The prediction engine 116's use of a prediction scenario model based on the target or serendipitous discovery is further described with respect to FIG. 5 below.

In addition, the prediction scenario model based on comments may operate under a scenario that the user interacts with comments from a particular comment thread (e.g., a comment thread the user is actively involved in (e.g., the comment thread the user created, or the user has contributed a reply), a comment thread where many users are involved in). The prediction engine 116's use of this prediction scenario model based on comments is further described with respect to FIGS. 3-4 below. In addition, there may be a prediction scenario model for a scenario that the user responds to an email, chat, or calendar events which mention the user or are from other users the user frequently interacts with. Under such scenario, the prediction scenario model may rank a calendar event for a meeting with other users with whom the user frequently interacts higher than other calendar events open to general users of the cloud-based content management platform 115.

The prediction engine 116 may provide input data to a prediction scenario model and obtain output data from the model. The input data may vary amongst prediction scenario models as further described in relation to FIGS. 3-5. As will be discussed in more detail below, an input to a prediction scenario model may be data from various signals associated with a document that represent a particular scenario the model is based on. The output data of a prediction scenario model may be a prediction scenario score that represents a probability of the user being interested in a document in accordance with a respective scenario. The prediction scenario score may also represent how likely the user is to interact with the document, if suggested. In case of using a plurality of prediction scenario models, the prediction engine 116 may obtain prediction scenario scores from each model and determine an overall document score based on the prediction scores from the different types of the prediction scenario models as described in details below with respect to FIG. 7. The prediction engine 116 may then use the overall document score to determine one or more documents for notification.

In some implementations, the prediction engine 116 may generate a suggestion card (see e.g. FIG. 2) for each document selected for notification based on the overall document scores and/or prediction scores. The suggestion card may include a reason text 209 that describes a reason for notifying the user of the document and one or more intelligent buttons 210 (210A, 210B) that enable the user to quickly access the document.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. As discussed above, the user devices 120A-120Z may each include a web browser and/or a client application (e.g., a mobile application or a desktop application.) A user may view a suggestion card 200 or a home screen of a cloud storage including the suggestion card 200 via the web browser or the client application using the cloud-based content management platform 115. For example, once the user logs into a cloud storage, the user may be presented with the suggestion card 200 for notification on a home screen. The user may select the suggestion card 200 to access a document represented by the suggestion card 200 or select an intelligent button (e.g., 210A or 210B of FIG. 2) to respond to an event associated with the document directly from the suggestion card 200 without opening the document. As such, the user device 120A associated with the user may send a request to display the suggestion card 200 and transmit user selections. In general, functions described in one implementation as being performed by the cloud-based content management platform 115 and/or the prediction engine 116 can also be performed on the user devices 120A through 120Z in other implementations, if appropriate. In addition, the functionality attributed to a particular component can be performed by different or multiple components operating together.

Figure 2:
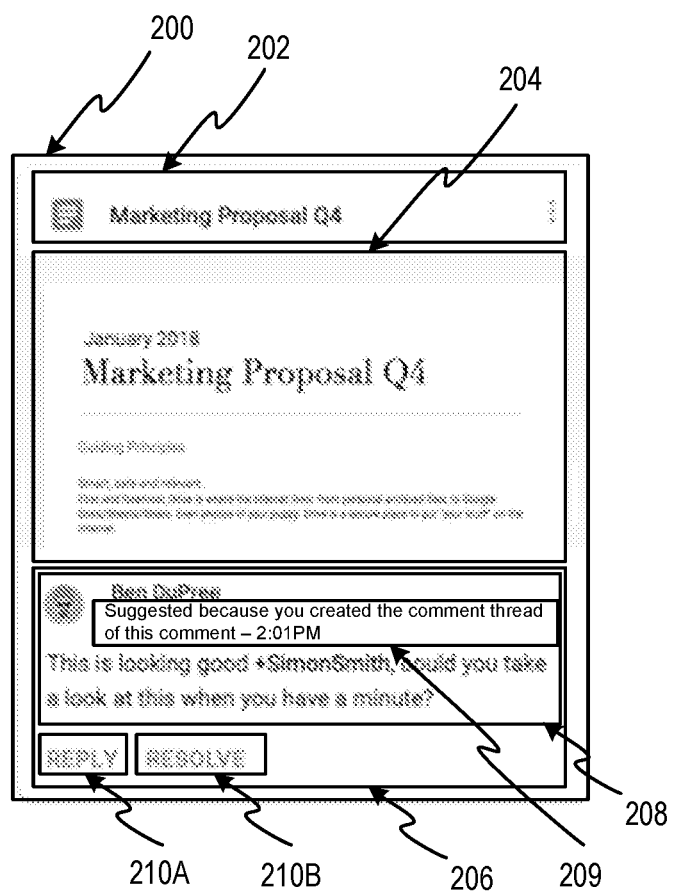
FIG. 2 illustrates an example user interface of a suggestion card to notify the user of an electronic document and/or an event and/or other changes in a state of the electronic document.

FIG. 2 illustrates an example of a user interface presenting a suggestion card 200 to notify the user of an electronic document and/or an event and/or other change in a state of the electronic document stored in a cloud storage of the user. The cloud storage is hosted by the cloud-based content management platform 115. In one implementation, the suggestion card 200 may be presented to the user as part of a home screen of the cloud-based content management platform. Such home screen may be provided to the user after the user successfully logged into the cloud storage of the cloud-based content management platform 115.

In some implementations, the suggestion card 200 may take a form of a card (i.e., a box resembling a card) as shown in FIG. 2, amongst other possible forms such as a list or a table. The suggestion card 200 represents a document and an event associated with the document. The prediction engine 116 may build the suggestion card 200 to notify the user about a suggestion of a document predicted to be of interest to the user. The suggestion card 200 may allow the user to quickly access the document represented in the suggestion card 200. In other implementations, the prediction engine 116 may compose the suggestion card 200 to notify the user as well as to enable the user to respond to the event represented by the suggestion card 200. When the prediction engine 116 uses one prediction scenario model, the prediction engine 116 may select a document with the highest prediction scenario score to generate the suggestion card 200. In cases where the prediction engine 116 uses a plurality of prediction scenario models, the prediction engine 116 may determine which documents to notify the user about based on an overall document score, determined using, for example, the method show in and described in relation to in FIG. 7 which incorporates all available prediction scenario scores for documents. The prediction engine 116 may limit a number of the suggestion cards 200 to be presented to the user. In an implementation, the prediction engine 116 may restrict a number and position of suggestion cards 200 that are based on a particular type of a prediction scenario model. For example, the prediction engine 116 may require a maximum one document from the prediction scenario model based on target or serendipitous discovery and place such a document only after a third position. The prediction engine 116 may also incorporate a temporal diversity (e.g., showing some documents to open now, and some to open in the next few hours when presenting suggestion cards). Detailed explanation of various implementations of methods for selecting a document for suggestion or notification to a user is described below with respect to FIGS. 3-7. As illustrated in FIG. 2, the suggestion card 200 includes a plurality of sections such as a document information section 202, document thumbnail section 204, and event section 206.

The document information section 202 may include information about the document, such as a title of the document, a type of the document (e.g., a word processing, spreadsheet, presentation slide), and an overflow menu option (e.g., a vertically oriented ellipse). Such document information may be presented as an icon or text. The prediction engine 116 may present more options when the user selects the overflow menu option, such as an option to share the document, add the document to favorites, locate the document in the cloud storage of the user, and remove the suggestion card 200. The document thumbnail section 204 may include a thumbnail image of a specific portion of the document. The prediction engine 116 may select a portion that is associated with the event of the suggestion card 200. For example, when the event is a comment event, the prediction engine 116 may take a snippet of a paragraph to where the comment event is added. In another implementation, the thumbnail may be an image of the first page of the document or a default image showing a type of the document and a title of the document without any reference to a portion of the document. In some implementations, the prediction engine 116 may open the document in response to the user's selection of the document thumbnail section 204.

The event section 206 may include details of the event. In some implementations, the prediction engine 116 may add information (e.g., a name and profile picture) of other user(s) associated with the event, content of the event, and a reason text describing a reason for notifying the user of the event and/or the document. For example, in FIG. 2, the event section 206 includes a profile picture and a name of "Ben DuPree" who created a comment event and the content of the comment event—"This is looking good+SimonSmith, could you take a look at this when you have a minute?." Under the name, "Ben DuPree," the event section 206 further includes a reason text ("Suggested because you created the comment thread of this comment") 209 along with a timestamp of the comment event.

In an implementation, the prediction engine 116 may determine the event and reason text based on data used as an input to a prediction scenario model that contributed the most to an output (i.e., the prediction scenario score) of the model. For example, the prediction engine 116 may use the prediction scenario model based on comments that employs data specifying whether or not the user has created a comment thread associated with a comment event. Then, the prediction engine 116 may compose the event section 206 based on information from the comment. Also, if the prediction engine 116 determines that a score for such criterion is the highest amongst scores from other criteria, then the prediction engine 116 may compose the reason text, such as "Suggested because you created the comment thread of this comment" to explain why the user is notified about the comment event. In another example, the prediction engine 116 may use the prediction scenario model based on target or serendipitous discovery that utilizes data specifying an amount of overlap in topicality of the document and the user's current working set of documents. The overlap of topicality may represent a measure or similarity score of how related the document is to the user's current set of working documents, and may be determined, for example, according to a predefined set of criteria such as a degree of overlap, an occurrence rate of words or phrases identified in a stored database as relating to a common field or topic, Jaccard similarity, cosine distance, Euclidean distance, and/or the like.

In case the prediction engine 116 determines that a score from that criterion is the highest amongst scores form other criteria, then the prediction engine 116 may compose the reason text, such as "Suggested based on documents for Project X." In another implementation, the prediction engine 116 may compose the reason text based on the most recent event of the document. For example, if the most recent event associated with the document is a calendar event that has the document attached, the prediction engine 116 may compose "12:30 pm today," which is the scheduled meeting time of the calendar event as the reason text.

The prediction engine 116 may determine the reason text based on a prediction scenario model that caused the documents to be selected for notification. In an implementation, when the prediction engine 116 uses a plurality of prediction scenario models and the document has a high overall document score from FIG. 7 and has the most contribution to the overall document score from a particular prediction scenario model, then the prediction engine 116 may mention description of the particular prediction scenario model in the reason text, such as "Suggested based on a serendipitous discovery."

The event section 206 may further include one or more intelligent buttons 210 (210A, 210B) to enable the user to quickly access the document or respond to the event being suggested to the user via the suggestion card 200. In an implementation, the prediction engine 116 may include, in the event section 206, an open button to enable the user to open the document or a preview button to enable the user to preview the document without opening the document using an application of the cloud-based content management platform 115. The prediction engine 116 may also enable the user to open the document of the suggestion card 200 responsive to detecting a user selection (e.g., a double click) on any part of the suggestion card 200. In another implementation, the prediction engine 116 may select one or more intelligent buttons 210 (210A, 210B) based on a type of the event included in the suggestion card 200. For example, if the event that the user is notified about via the suggestion card 200 is a comment event, then the prediction engine 116 may select a reply intelligent button 210A or a resolve intelligent button 210B. The prediction engine 116 may enable the user to directly reply to the comment event within the suggestion card 200 without opening the document via the reply intelligent button 210A. In an implementation, in response to the prediction engine 116 detecting the user's selection of the reply intelligent button 210A, the prediction engine 116 may provide a text box inside the suggestion card 200 for the user to enter content of the reply and an add button to add the reply content to the respective comment thread.

Also, the prediction engine 116 may enable the user to close the comment thread from the suggestion card 200 without requiring the user to open the document. In another example, if the user is notified about an email or chat event via the suggestion card 200, the prediction engine 116 may include a reply button and a locate-the-item button. The locate-the-item button may enable the user to find the email or the chat message about which the user is being notified by presenting an inbox highlighting the email or a chat window highlighting the chat message. Accordingly, the prediction engine 116 may generate any other intelligent button that provides a short cut to a response the user would take for the event described in the event section 206. In some implementations, the prediction engine 116 may limit a number of intelligent buttons 210 of a specific type (210A, 210B) (e.g. maximum of one calendar event action can be included in the final set of suggestion cards to be presented.)

Figure 3:
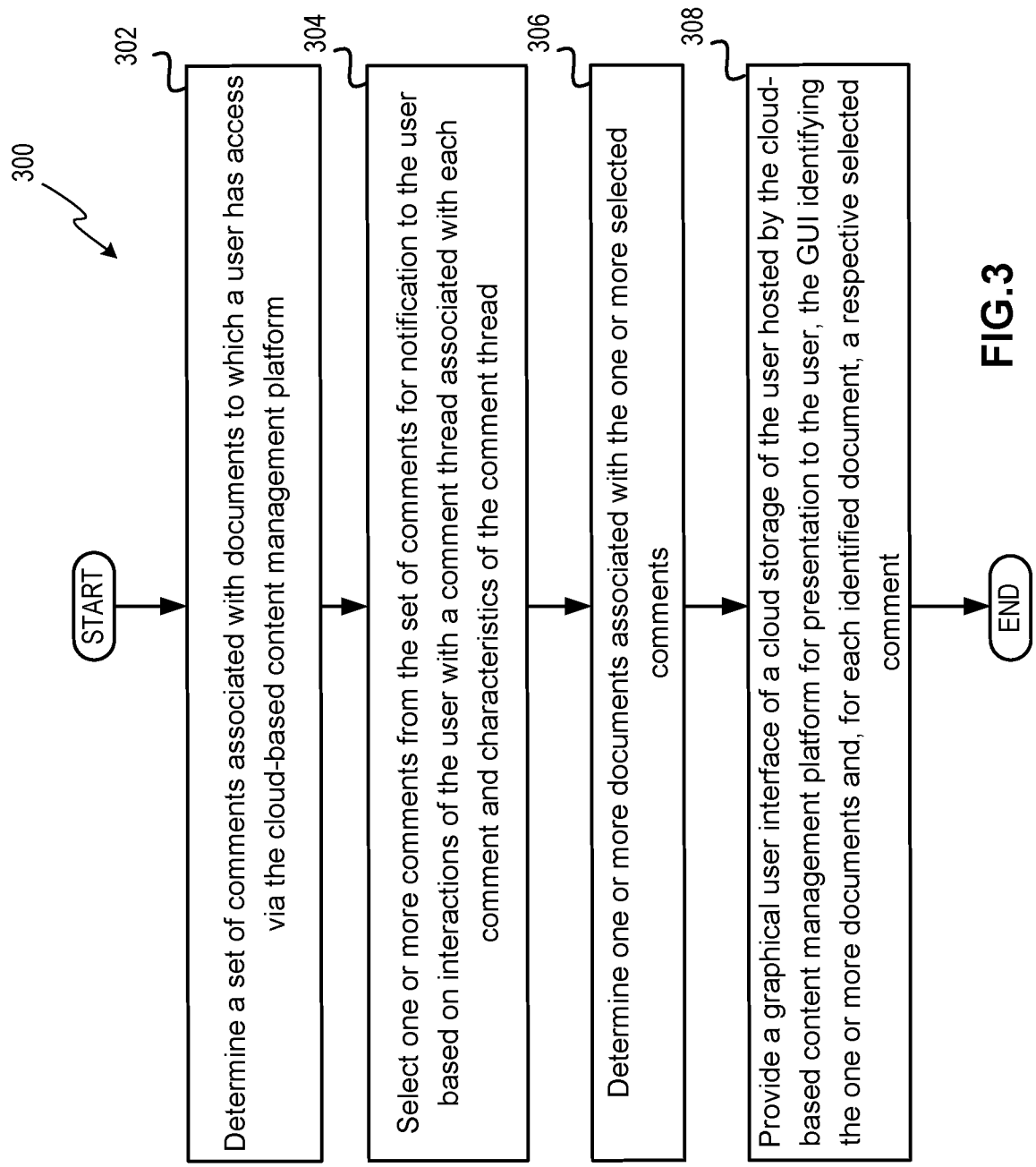
FIG. 3 illustrates a flow diagram of aspects of a method for selecting a document about which to notifying a user of the cloud-based content management platform, in accordance with one implementation of the disclosure.

FIG. 3 illustrates a flow diagram of aspects of a method 300 for predicting or selecting a document for notifying a user of the cloud-based content management platform 115, in accordance with one implementation of the disclosure.

The method 300 may be performed by the prediction engine 116 of FIG. 1. In another implementation, method 300 may be performed by a client application executed by one or more processing devices of the user device 120. The method 300 may be carried out for each user of the cloud-based content management platform 115. Further, the method 300 may be performed when a user requests the server 112 access to a cloud storage of the user or a home screen via the cloud-based content management platform 115. In some implementations, the method 300 may be performed to notify the user of a comment made in a document associated with the user via the cloud-based content management platform 115 by using the prediction scenario model based on comments.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 302, the prediction engine 116 may determine a set of comments associated with documents to which the user has access via the cloud-based content management platform 115. The prediction engine 116 may identify documents that have been shared with the user or created by the user as the documents to which the user has access. To identify such documents, the prediction engine 116 may query access control list of documents that lists the user as a creator, viewer, editor, or subscriber (i.e., a user with whom the document is shared). From the documents identified, the prediction engine 116 may determine comments added to each document by other users. For each comment, the prediction engine 116 may determine information related to a respective document such as a timestamp and a user who created the respective comment. Then, the prediction engine 116 may compile a set of comments that includes comments added by other users to a document the user has accessed within a last predetermined time period (i.e., recent comments). For example, the user may be working on multiple projects and collaborating via documents using the cloud-based content management platform 115. In such case, when the user logs into the cloud storage via the cloud-based content management platform 115, the prediction engine 116 may determine the documents the user has accessed (e.g., documents the user is working on). Then, the prediction engine 116 may identify comments made by collaborators on the documents and among those comments, determine the comments made in the last two days. As such, the prediction engine 116 can determine candidates of comments the user would likely be interested in responding to.

The prediction engine 116, at block 304, may select one or more comments from the set of comments determined at block 302 for notification to the user based on information about a comment thread the respective comment under consideration belongs to. The comment thread is a group of a plurality of comments having a first comment and a second comment added in reply to the first comment. The prediction engine 116 may select a comment from the set based on interactions of the user with a comment thread associated with each comment. In one implementation, the prediction engine 116 may identify a comment thread associated with a respective comment for each comment in the set of comments from block 302. Then, the prediction engine 116 may determine the interactions of the user with the comment thread in order to select a comment for notification to the user. For example, in some implementations, the prediction engine 116 may determine whether the user has added an initial comment (i.e. the comment that started the comment thread) in the comment thread. The prediction engine 116 may also determine whether the user has added any comment to the comment thread as a reply to the initial comment in the comment thread or any other comment in the comment thread.

The prediction engine 116 may perform the selection of a comment for notification at block 304 further based on characteristics of the comment thread associated with each comment. The characteristics of the comment thread may be measured in various ways. Some examples of the characteristics of the comment thread are a status of the comment thread (whether the comment thread is open or closed), a number of comments included in the comment thread, a number of different users involved in the comment thread, a proportion of comments in the comment thread that are added or closed by the user, a proportion of comments in the comment thread that are added by other users, and a length of time period the comment thread remained open.

The prediction engine 116 may perform the selection of a comment for notification at block 304 further based on an importance weight assigned to each user (i.e. any other user) who added or generated the comments. The prediction engine 116 may determine the importance weight based on importance of a respective user in a social network associated with the cloud-based content management platform 115. Some examples of the social network may be an organizational chart for users of the cloud-based content management platform 115 (i.e., a higher weight to a user associated with a higher position in the chart), a collaborator graph based on frequency and recency from the user's response history (i.e., a higher weight to more frequent collaborators), an affinity graph including affinity scores (e.g., affinity-based similarity measure) for other users (i.e., a higher weight to a user having a higher affinity score), and a reputation graph (i.e., a higher weight to more popular users), among other things.

In selecting the comment at block 304, the prediction engine 116 may determine a comment score for each comment in the set from block 302 based on the interactions of the user with the comment thread and characteristics of the comment thread. In another implementation, the prediction engine 116 may further incorporate the importance weight for each user who added the respective comment. The comment score may indicate a probability of the user being interested in the respective comment or the document that contains the respective comment. The prediction engine 116 may select one or more comments for notification based on the comment scores. The prediction engine 116 may use a prediction scenario model based on comments to determine the comment scores. The prediction engine 116 may adopt a heuristic approach or machine learning approach to build the prediction scenario model. In the heuristic approach, the prediction engine 116 may apply a weighted sum as the prediction scenario model and further normalize the weighted sum to be between 0 and 1. The prediction engine 116 may assign a weight and numerical value between 0 and 1 for each criterion representing the interactions of the user with the comment thread and characteristics of the comment thread. The prediction engine 116 may update the assigned weight and numerical value to better reflect the user's interest.

In the machine learning approach, the prediction engine 116 may train a machine learning model. The prediction scenario model based on comments may also be referred to as a machine learning model hereinafter. The prediction engine 116 may include a training engine that is capable of training a prediction scenario model. The prediction scenario model may be a machine learning model corresponding to a model artifact that is created by the training engine using training data that includes training inputs and corresponding target outputs (i.e., correct answers for respective training inputs). In some implementations, the prediction engine 116 may generate training data that includes one or more training inputs and one or more target outputs. The training input may include data indicating interactions of the user with a comment thread and characteristics of the comment thread for comments added by other users to documents the user is involved in. In another implementation, the target input may additionally include data indicating importance weights of other users who added the comments. The target outputs may comprise responses such as a reply to the comment, closing a comment thread the respective comment belongs to, accepting or rejecting a suggested edit associated with the comment, marking the to-do task assigned in the comment as completed by the user, or no response. In another implementation, the training data may not be specific to a particular user, but rather for various users of the cloud-based content management platform 115.

The training engine may find patterns in the training data that map the training input to the target output (i.e., the answer to be predicted) and provide the machine learning model that captures these patterns. The machine learning model may be composed of, e.g., a single level of linear or non-linear operations (e.g., a support vector machine [SVM] or may be a deep network (i.e., a machine learning model that is composed of multiple levels of non-linear operations.) An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. Once the prediction engine 116 determines that the machine learning model is ready for use, the prediction engine 116 may provide data for the interactions of the user with the comment thread and characteristics of the comment thread as an input to the trained machine learning model (i.e., prediction scenario model). Then, the prediction engine 116 may obtain an output from the trained machine learning model indicating a likelihood that the user will be interested a particular comment from the comment thread, e.g., as a comment score having a numerical value between 0 and 1.

In some implementations, the prediction engine 116, at block 304, may further consider information about a document associated with the comment, the comment itself, and user activity in determining the comment score. Some examples of information about documents associated with each comment in the set from block 302 may include a number of users involved in the respective document, a number of users with different types of access to the respective document, recency of events in the documents, recency of a specific type of events (e.g., edit, view, or comment,) a proportion of comment threads in the document that are started or closed by the user. For information about the comment, the prediction engine 116 may further consider a length of the comment text and whether the comment is directed to the user by explicitly mentioning the user in the comment text.

After obtaining the comment score, the prediction engine 116 may rank each comment in the set of comments from block 302, based on the comment scores. In one implementation, the prediction engine 116 may assign the comment a higher comment score with a higher ranking than the comments with lower comment scores. The prediction engine 116 may then, select a subset of comments from the set of comments based on rankings.

At block 306, the prediction engine 116 may determine one or more documents associated with the one or more selected comments from block 304. Implementations of determining the documents for the block 306 will be described in detail below with respect to FIG. 4.

The prediction engine 116, at block 308 may provide a GUI for presentation to the user based on a user account with the cloud-based content management platform 115. The user account may define which documents stored on the cloud-based content management platform 115 are associated with the user (the user has access to). Storage of such documents is referred to herein as a cloud storage of the user. The prediction engine 116 may provide the GUI upon the user's log into the cloud-based content management platform 115. In another implementation, the prediction engine 116 may provide the GUI as a part of the home screen of the cloud-based content management platform. The GUI may identify document(s) associated with the selected comment(s). The GUI may further identify, for each document being identified in the GUI, the respective selected comment that is associated with the respective document. If a plurality of selected comments is associated with one document, then the prediction engine 116 may select the most recent comment or a comment with the highest ranking from the plurality of comments. In another implementation, the prediction engine 116 may determine a comment with the highest ranking from a comment thread having a highest ranking amongst other comment threads in the document. The ranking of comment threads will be described in details below with respect to FIG. 4.

In some implementations, the GUI may include one or more suggestion cards 200 of FIG. 2 to identify the documents and comments. A suggestion card may identify a document and a comment that is associated with the document as explained in details above with respect to FIG. 2. For example, the suggestion card 200 may include title information of the document such as a document type and a title of the document in the document information section 202, an image representation (e.g., a thumbnail) of the document in the document thumbnail section 204, and one or more intelligent buttons 210 (210A, 210B) to reply to the comment from the suggestion card without opening the document, another intelligent button(s) 210 (210A, 210B) to close the comment from the suggestion card without opening the document, a text of the content for the comment, and a text describing a reason for the selection of the respective comment in the event section 206.

Thus, when the GUI identifying the one or more electronic documents and the respective selected comment(s) is presented to the user, the user may provide, via the GUI (for example via an intelligent button 210A, 210B), one or more inputs relating to one or more of the documents and/or comments identified in the GUI. This enables interaction between the user and the documents stored in the cloud storage via the cloud-based content management platform 115.

Figure 4:
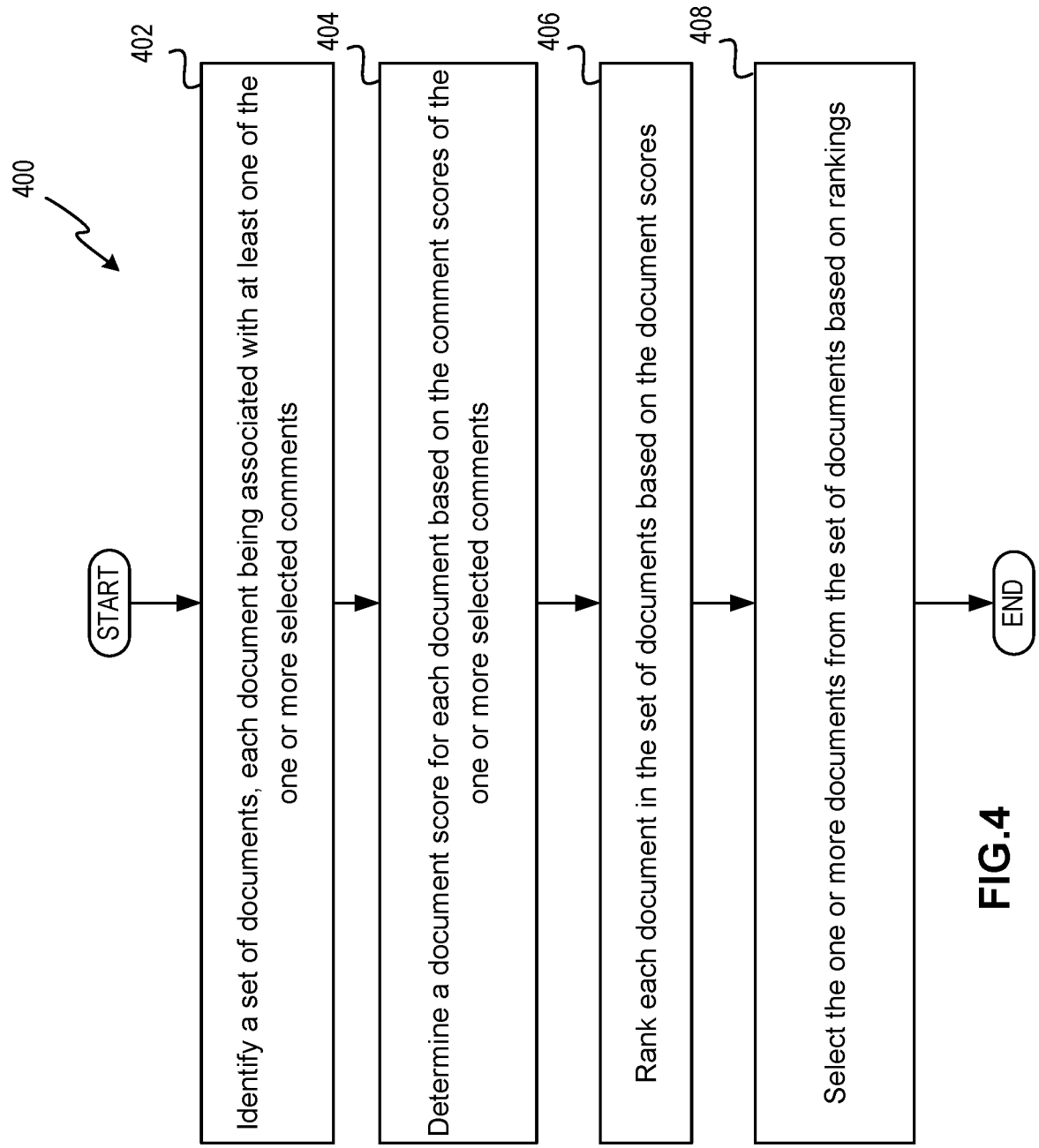
FIG. 4 depicts a flow diagram of aspects of a method for determining a document that is associated with one or more comments selected, in accordance with one implementation of the disclosure.

FIG. 4 depicts a flow diagram of aspects of a method 400 for determining a document, at block 306 of FIG. 3, that is associated with comment(s) selected at block 304 of FIG. 3, in accordance with one implementation of the disclosure. The method 400 may be performed using the prediction scenario model based on comments.

At block 402, the prediction engine 116 may identify a set of documents associated with at least one of the comments selected at block 304 of FIG. 3. The prediction engine 116 may query the data store 114 for documents containing any comments selected at block 304 of FIG. 3.

Once the documents have been identified, at block 404, the prediction engine 116 may determine a document score for each document based on the comment scores of the selected comments from block 304. The document score may indicate a probability the user may be interested in interacting with the document. In an implementation, the prediction engine 116 may assign a highest document score to a document with a comment having the highest comment score in accordance with the prediction scenario model. In another example where a document is associated with a plurality of the comments selected from block 304 and the plurality of the comments may belong to different comment threads in the document, the prediction engine 116 may identify a set of comment threads from each document where each comment thread is associated with at least one of the selected comments from block 304. Then, the prediction engine 116 may determine a comment thread score for each comment thread based on the comment score of the selected comments associated with the comment thread. The comment thread score may indicate the probability of the user being interested in the comment thread. In one implementation, the prediction engine 116 may use a weighted sum as the prediction scenario model based on comments to calculate the comment thread score. In another implementation, the prediction engine 116 may assume each comment score as an independent event and determine a probability of the independent events as a comment thread score in accordance with the prediction scenario model based on comments. Once the prediction engine 116 determines comment thread scores for the comment threads in each document, the prediction engine 116 may determine a document score for each document based on a weighted sum of the comment thread scores as the prediction scenario model based on comments.

At block 406, the prediction engine 116 may rank each document in the set of documents identified at block 402, based on the document scores. At block 408, the prediction engine 116 may select one or more documents from the set of documents of block 402 based on the rankings. The prediction engine 116 may present the selected documents to the user for notification via the suggestion cards 200 at block 308 of FIG. 3.

Figure 5:
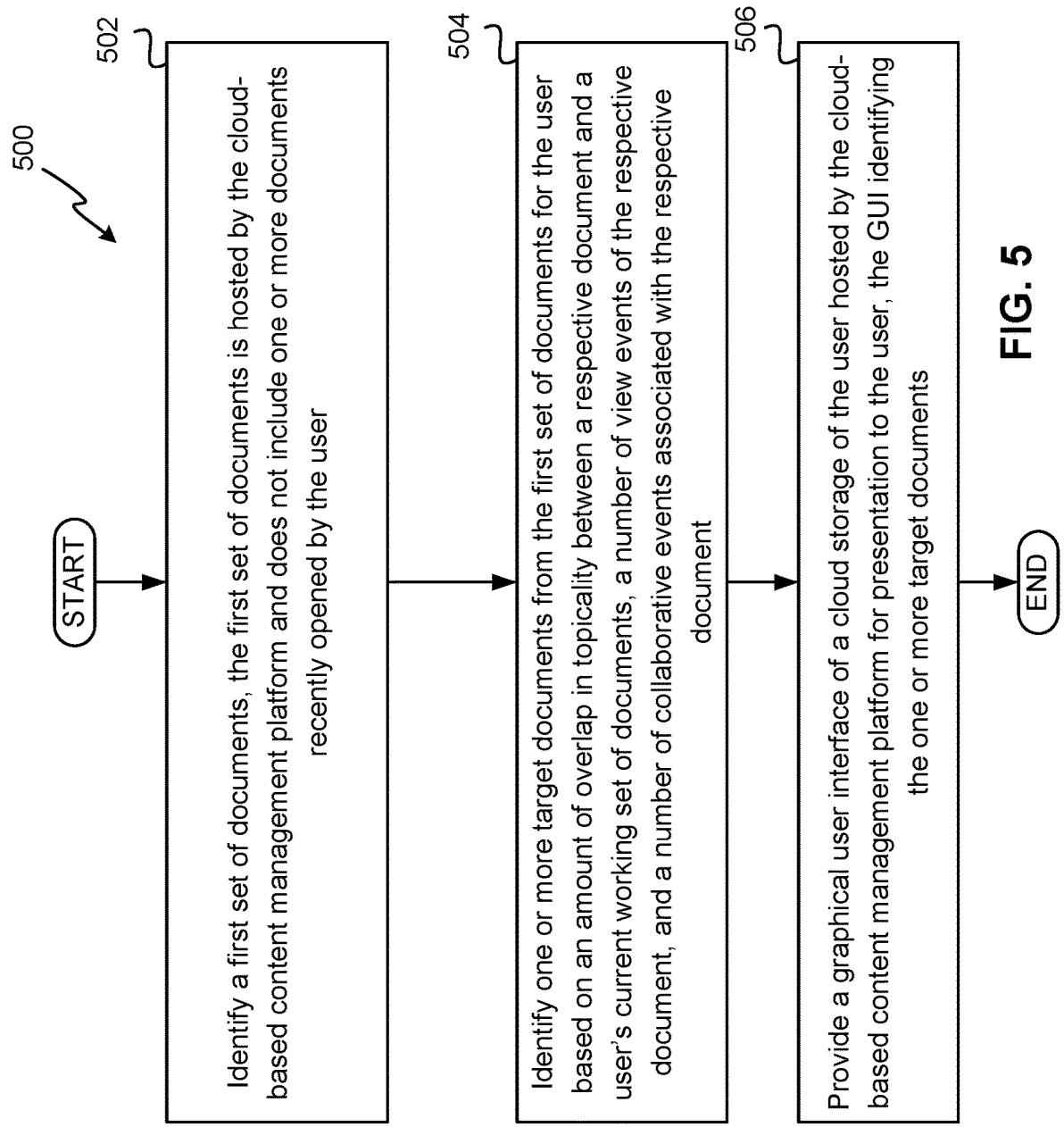
FIG. 5 depicts a flow diagram of aspects of a method for predicting a document for a user of the cloud-based content management platform, in accordance with another implementation of the disclosure.

FIG. 5 depicts a flow diagram of aspects of a method 500 for predicting a document for a user of the cloud-based content management platform 115, in accordance with another implementation of the disclosure.

The method 500 may be performed by the prediction engine 116 of FIG. 1. In another implementation, the method 500 may be performed by a client application executed by one or more processing devices of the user device 120. The method 500 may be carried out for each user of the cloud-based content management platform 115. Further, the method 500 may be performed when a user requests the server 112 for access to a cloud storage of the user or a home screen via the cloud-based content management platform 115. In some implementations, the method 500 may be performed to notify the user of the cloud-based content management platform 115 about a document to be suggested via the cloud-based content management platform 115 by using the prediction scenario model based on target or serendipitous discovery. In one implementation, the method 500 may be simultaneously performed with the method 300.

At block 502, the prediction engine 116 may identify a first set of documents. In some implementations, the documents in the first set are hosted by the cloud-based content management platform 115. Moreover, the first set of documents may exclude documents recently opened by the user. Thus, the prediction engine 116 may select documents of the cloud-based content management platform 115 that the user may no longer remember or may not have opened at all, as candidates for suggestion. Examples, documents that the user may no longer remember may include, for example, at least one of: documents that have expired from a cache or history or that may not have had an action, such as being opened, read, edited, modified, or otherwise interacted with by the user for a determined or predetermined period of time.

In some implementations, the prediction engine 116 may determine the first set of documents based on events from collaborators of the cloud-based content management platform 115 (i.e., a level of collaboration.) For example, the prediction engine 116 may identify a set of documents associated with the collaborators or documents the collaborators can open, view, or edit. The prediction engine 116 may further determine from the set of documents, documents having recent events (e.g., open, view, edit, or comment event) by a collaborator as candidate documents for suggestion. In an implementation, the prediction engine 116 may define any users of the cloud-based content management platform 115 who has worked on the same document as the user as a collaborator. For example, the prediction engine 116 may determine a collaborator by identifying another user of the cloud-based content management platform 115 who has performed a view, edit, or comment event with respect to a document that is shared with the user via the cloud-based content management platform 115 during a predetermined time period. In one implementation, the prediction engine 116 may determine the first set of documents based on a number of views by collaborators or any other users (i.e., a level of popularity.) In some implementations, the prediction engine 116 may further identify candidate documents for suggestion based on an importance weight assigned to each collaborator as described in detail in relation to the block 304 of FIG. 3.

In determining the first set of documents as candidates for suggestion, the prediction engine 116 may further incorporate documents that are related to documents in the user's current working set of documents (i.e., a level of relatedness.) The prediction engine 116 may determine the user's current working set of documents. The user's current working set of documents may include documents the user has accessed within a last predetermined time period via the cloud-based content management platform 115. For example, any documents the user has opened, viewed, or edited via the cloud-based content management platform 115 for the past week may be considered as the user's current working set of documents. In another implementation, the prediction engine 116 may only use a specific type of access (e.g., edit) to define the user's current working set of documents. Once the prediction engine 116 has identified the user's current working set of documents, the prediction engine 116 may determine a key text of each document in the user's current working set. The key text may be indexed and represent a topic of content of the document. The key text may be extracted from a title or content of the respective document. The key text may be a word, phrase, or sentence. The key text may be manually entered by users associated with the document or automatically generated via the cloud-based content management platform 115. The key text may be used to query associated documents stored in the data store 114. The prediction engine 116 may query the data store 114 for any documents associated with the key texts of the user's current working set of documents. As such, the prediction engine 116 may determine the set of documents that are related to documents in the user's current working set as candidates for suggestion.

In some implementations, the set of documents associated with collaborators and the other set of documents related to the user's current working set may include documents that the user has not accessed. In this way, the prediction engine 116 may select documents that the user is not aware of because the user never accessed those documents as candidates for suggestion. In an implementation, the prediction engine 116 may filter out documents recently opened by the user from these two sets in order to select documents that the user may no longer remember as candidates for suggestion. Therefore, the prediction engine 116 may generate the consolidated set of documents for suggestion (i.e., the first set of documents) by combining the set of documents associated with the collaborators and the set of documents related to the user's current working set and filtering out documents recently opened by the user. In an implementation, the prediction engine 116 may further filter out documents that may not be meaningful to the user because less than a threshold number of collaborators are working on the document. Accordingly, the prediction engine 116 may exclude, from the first set, documents to which the user does not have access and have events performed by less than a predetermined number of the collaborators. In another implementation, the prediction engine 116 may also eliminate documents that are set to be not discoverable (e.g., via a tag in a document's metadata) by a search performed via the cloud-based content management platform 115.

At block 504, the prediction engine 116 may identify one or more target documents from the first set of documents for suggestion to the user. A target or a serendipitous document may be a document that the user may not know about (e.g. because the user may not have opened, edited or otherwise interacted with it) or no longer remember (e.g. because it has been longer than a determined or predetermined period of time since the user last interacted with that document), and is likely to be of interest to the user. In one implementation, the prediction engine 116 may identify the target document based on at least one of a level of relatedness of a respective document in the set from block 502 to the user's current working set of documents, a level of popularity of a respective document amongst users, a level of collaboration associated with the respective document, etc.

The prediction engine 116 may measure the level of relatedness as an amount of overlap in topicality between a respective document and the user's current working set of documents. The overlap of topicality may represent a measure or similarity score of how related the document is to the user's current set of working documents, and may be determined, for example, according to a predefined set of criteria such as a degree of overlap, an occurrence rate of words or phrases identified in a stored database as relating to a common field or topic, Jaccard similarity, cosine distance, Euclidean distance, and/or the like. The prediction engine 116 may identify topicality of documents from key texts assigned to the documents, or a particular term repeated in a document or content of the document, among other things. Then, the prediction engine 116 may measure how similar the topicality of the respective document is to documents in the user's current working set.

The prediction engine 116 may determine the level of popularity of a document based on a number of view events during a predetermined time period. The view events may be by any users or may be by users within the user's social network (e.g., collaborators, friends, or group members) via the cloud-based content management platform 115.

The prediction engine 116 may measure the level of collaboration for a document based on a number of collaborative events associated with the respective document. The collaborative events are interactive events (i.e., an event generated in response to an event by another user) exchanged back and forth between users in context of collaboration using a document. The collaborative events may take place in a form of comment threads (e.g., post a comment and reply to the comment), suggesting edits (e.g., suggest an edit and accept or reject the suggestion), or sharing a document (e.g., share a document and open the document). Accordingly, in one implementation, the prediction engine 116 may determine the number of collaborative events in view of a number of the user's interactive events, a number of other users' interactive events and a likelihood of the user performing an interactive event with other users involved in the respective document. The prediction engine 116 may estimate the likelihood of the user performing the interactive event with others based on the past response history of the user.

In some implementations, the prediction engine 116 may determine a target or serendipity score for each document in the first set from block 502 based on at least one of the level of relatedness, the level of popularity, or the level of collaboration. The prediction engine 116 may then use the target or serendipity scores to select documents with high scores as target documents for suggestion to the user. The target or serendipity score may indicate a probability of the user being interested in the respective document in a situation where the user is not aware of or has forgotten about the respective document which may be helpful to the user. The prediction engine 116 may adopt a heuristic approach or machine learning approach in determining the target or serendipity scores. In the heuristic approach, the prediction engine 116 may apply a weighted sum as the prediction scenario model and further normalize the weighted sum to be between 0 and 1. The prediction engine 116 may assign a weight and numerical value between 0 and 1 for each level of relatedness, level of popularity, and the level of collaboration.

In the machine learning approach, the prediction engine 116 may train a machine learning model. In some implementations, the prediction engine 116 may generate training data that includes one or more training inputs and one or more target outputs. The prediction scenario model based on target or serendipitous discovery may also be referred to as a machine learning model hereinafter. The training input may include data indicating the level of relatedness, level of popularity, and/or level of collaboration of each document in the first set from the block 502. The target outputs may comprise the user's responses like open, view, edit, or share a respective document, or no response. In another implementation, the training data may not be specific to a particular user, but rather for various users of the cloud-based content management platform 115. Once the prediction engine 116 determines that the machine learning model is ready for use, the prediction engine 116 may provide current input (e.g., current data for the level of relatedness, level of popularity, and the level of collaboration for documents in the first set from block 502) to the trained machine learning model. Then, the prediction engine 116 may obtain an output from the trained machine learning model as a target or serendipity score having a numerical value between 0 and 1. In one implementation, the prediction engine 116 may, for each document in the first set from block 502, apply an amount of overlap in topicality between a respective document and the user's current working set of documents, a number of view events of the respective document, and/or a number of collaborative events associated with the respective document to the trained machine learning model as an input. Then, the prediction engine 116 may obtain, from the trained machine learning model, an output. The output may indicate a probability of the user being interested in the respective document.

At block 506, the prediction engine 116 may provide a GUI 200 of a cloud storage of the user hosted by the cloud-based content management platform 115 for presentation to the user. The GUI 200 may identify the one or more target documents. In some implementations, the GUI 200 may include one or more suggestion cards. Each suggestion card may identify each target document. Further, each suggestion card may include a title information (e.g., a document type and a title of a respective document) in the document information section 202, an image representation (e.g., a thumbnail) of the respective document in the document thumbnail section 204, and one or more intelligent buttons 210 (210A, 210B) providing access (e.g., open, view, edit) to the respective document and a reason text describing a reason for identifying the respective document in the event section 206 as described in detail with respect to the FIG. 2 above.

Figure 6:
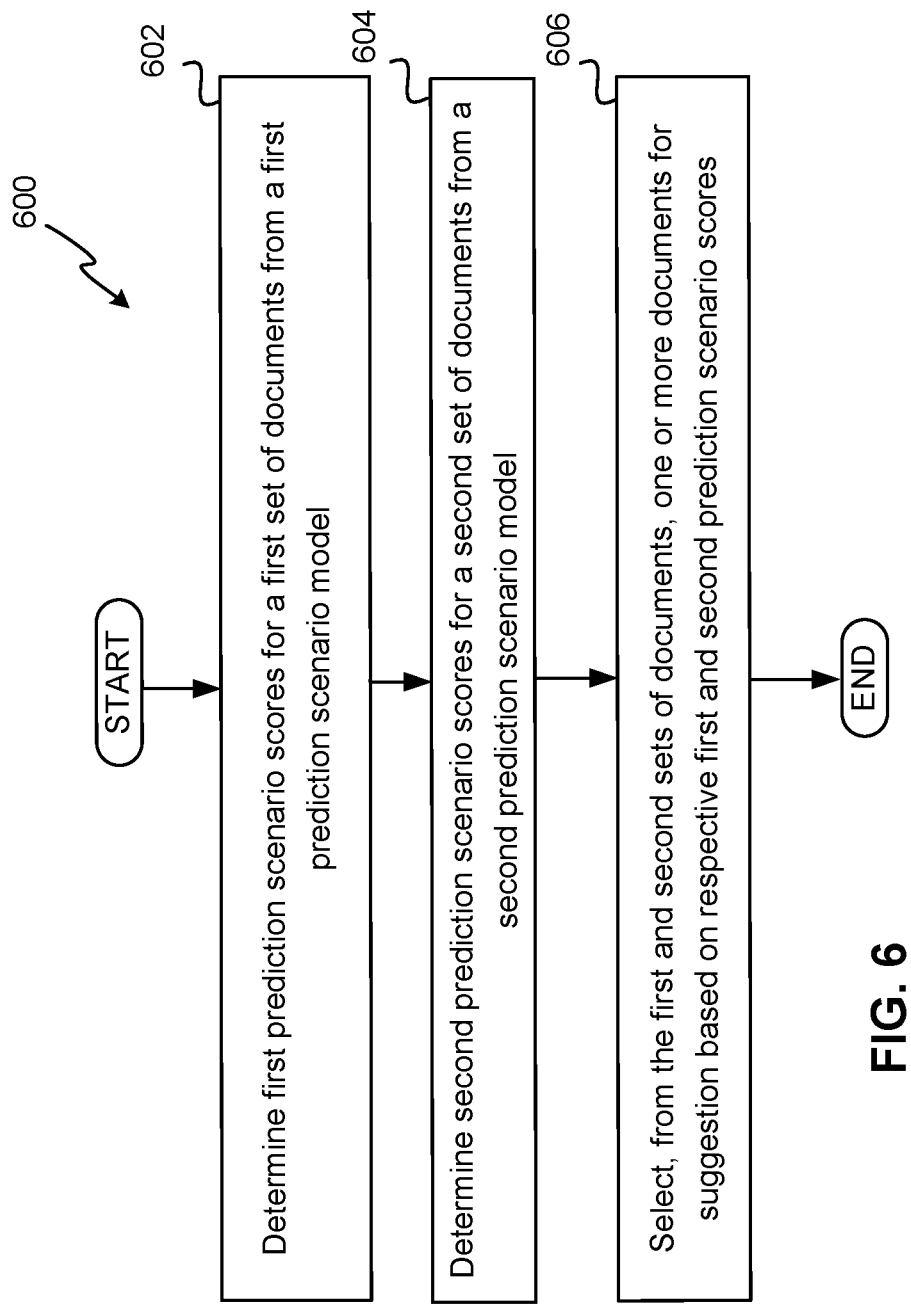
FIG. 6 depicts a flow diagram of aspects of a method for predicting a document for the user based on a plurality of prediction scenario models, in accordance with one implementation of the disclosure.

FIG. 6 depicts a flow diagram of aspects of a method 600 for predicting a document for the user based on a plurality of prediction scenario models, in accordance with one implementation of the disclosure.

The method 600 may be performed by the prediction engine 116. In another implementation, method 600 may be performed by a client application executed by one or more processing devices of the user device 120. The method 600 may be performed when the user requests the server 112 for access to the cloud storage or a home screen via the cloud-based content management platform 115. The method 600 may be carried out when the prediction engine 116 utilizes a plurality of prediction scenario models to predict a document for suggestion to the user. Examples of prediction scenario models include the prediction scenario model based on routine, target or serendipitous discovery, and comments as described above in relation to FIG. 1. In an implementation, the prediction engine 116 may run the plurality of prediction scenario models in real-time, responsive to receiving a request from the user to access the cloud storage or the home screen of the cloud-based content management platform. In another implementation, the prediction engine 116 may run all or some prediction scenario models on a periodic basis and store the prediction scores in the data store 114.

The prediction engine 116 may obtain outputs (e.g., prediction scenario scores) from each prediction scenario model. In an implementation where the prediction engine 116 utilizes two prediction scenario models, at block 602, the prediction engine 116 may determine first prediction scenario scores for a first set of documents from a first prediction scenario model. In some implementations, the prediction engine 116 may identify a set of documents associated with input data required by the first prediction scenario model as the first set of documents. The prediction engine 116 may run the first prediction scenario model by providing the required information associated with each document from the first set as an input and obtain a prediction score for each document. A prediction scenario score may represent a probability of the user being interested in the respective document under a respective scenario of the prediction scenario model. Such prediction score may range from 0 to 1. In an implementation, the prediction engine 116 may run the prediction scenario model based on comments by providing data representing the user's interaction with a comment thread in a document and characteristics of the comment thread for each document as an input. The prediction engine 116 may subsequently obtain prediction scenario scores for the documents.

At block 604, the prediction engine 116 may determine second prediction scenario scores for a second set of documents using a second prediction scenario model. The prediction engine 116 may run the prediction scenario model based on target or serendipitous discovery by providing data representing a level of relatedness, collaboration, and popularity of each document as an input. The prediction engine 116 may subsequently obtain prediction scenario scores for the documents. In some implementations, the set of documents used in one prediction scenario model may be different from that of another model because different models may be based on different scenarios. For example, in running the prediction scenario model based on comments, the prediction engine 116 may use data from documents that have comments recently added by other users; whereas for the prediction scenario model based on target or serendipitous discovery, the prediction engine 116 may use data from documents that have comments recently added by other users, but exclude those the user has recently opened. In another example, a set of documents used in the prediction scenario model based on target or serendipitous discovery and a set of documents in the model based on the routine may be mutually exclusive because the former model is built under the scenario that explicitly excludes recently opened documents by the user; whereas the latter model takes into account documents recently opened or accessed in any other ways by the user.

At block 606, the prediction engine 116 may select, from the first and second sets of documents, documents for suggestion based on respective first and second prediction scenario scores. Implementations of the block 606 will be discussed in details with respect to FIG. 7. In some implementations, the prediction engine 116 may further provide a plurality of suggestion cards for the selected documents from block 606 on the home screen GUI.

Figure 7:
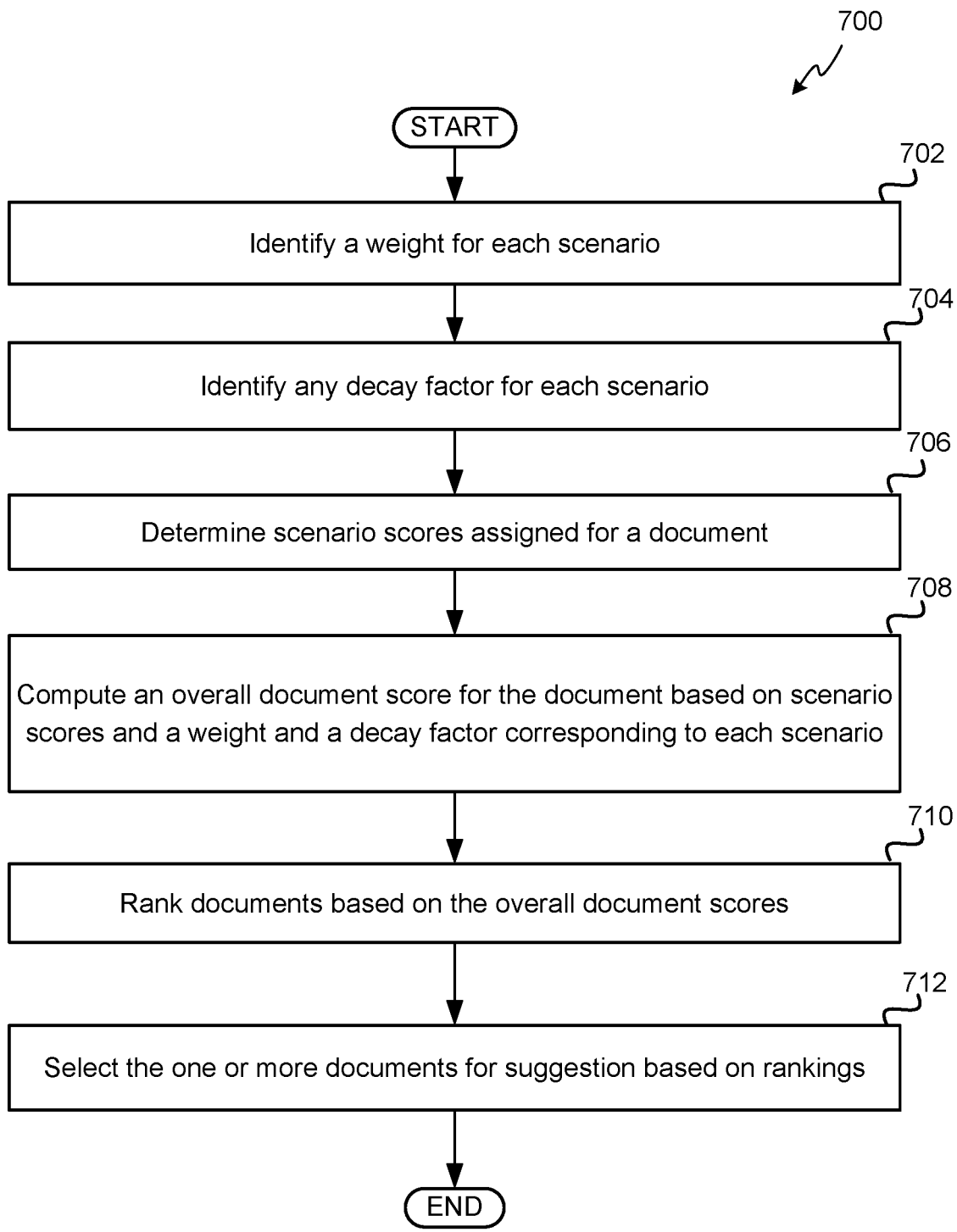
FIG. 7 illustrates a flow diagram of aspects of a method for selecting a document for suggestion, in accordance with one implementation of the disclosure.

FIG. 7 illustrates a flow diagram of aspects of a method 700 for selecting a document for suggestion, at block 606 of FIG. 6, in accordance with one implementation of the disclosure.

At block 702, the prediction engine 116 may identify a weight for each scenario used in the plurality of prediction scenario models from blocks 602 and 604 of FIG. 6. The prediction engine 116, at block 704, may also identify any decay factor for each scenario. In some implementations, a value of a decay factor may be initially pre-set by the prediction engine 116. For example, the prediction engine may initially set a decay factor for the target or serendipitous discovery scenario with a small numerical value (e.g., 0.01). The decay factor may be used to exponentially decrease contribution of a prediction scenario score from a particular prediction scenario model in calculating an overall document score in block 708. In some implementations, the prediction engine 116 may update the weight and decay factor for each scenario. At block 706, the prediction engine 116 may determine prediction scenario scores assigned to each document in the first and second set of documents from blocks 602 and 604 of FIG. 6. Each prediction scenario score is associated with different prediction scenario models. In an implementation, some documents may have only one prediction score assigned, while others may have more than one prediction scores.

At block 708, the prediction engine 116 may compute an overall document score for each document based on prediction scenario scores and a weight and decay factor corresponding to each scenario. The prediction engine 116 may add a product of prediction scenario score, weight, and any decay factor for each scenario to determine the overall document score. In an implementation, the prediction engine 116 may further consider a standard deviation of the different prediction scenario scores in calculating the overall document score.

At block 710, the prediction engine 116 may rank documents based on the overall document scores. In an implementation, the prediction engine 116 may rank documents in ascending or descending order of the overall document scores. The prediction engine 116 may, at block 712, select a limited number of documents for suggestion based on the rankings.

Figure 8:
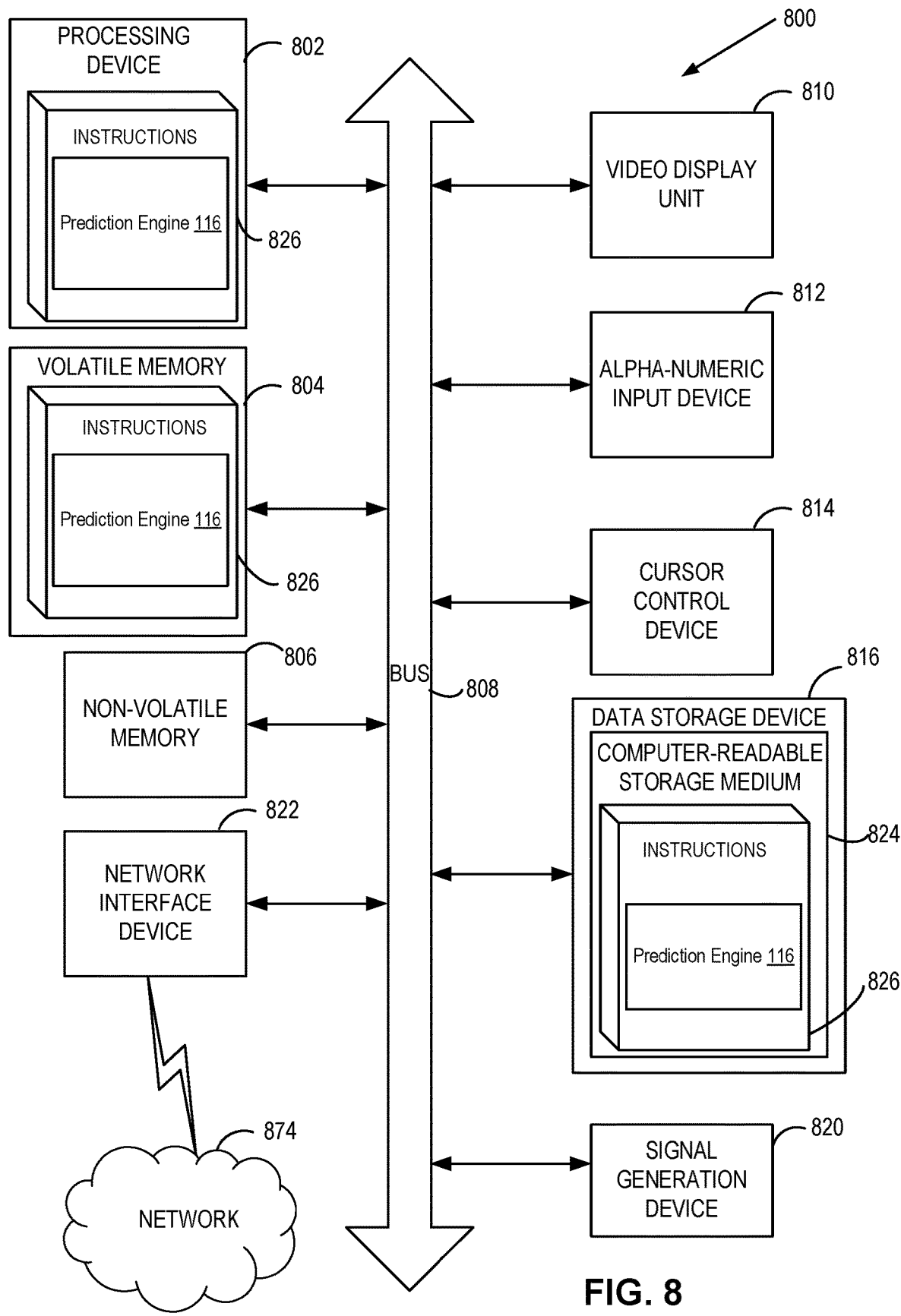
FIG. 8 depicts a block diagram of an example computing system operating in accordance with one or more aspects of the present disclosure.

FIG. 8 depicts a block diagram of an example computing system operating in accordance with one or more aspects of the present disclosure. In various illustrative examples, computer system 800 may correspond to any of the computing devices within system architecture 100 of FIG. 1. In one implementation, the computer system 800 may be a server 112. In another implementation, the computer system 800 may be each of the user devices 120A-120Z.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions implementing the prediction engine 116 of FIG. 1 for implementing the methods described herein.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the above description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "ranking", "identifying", "determining", "notifying", "predicting", "suggesting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
identifying, by a processor, a subset of word processing or spreadsheet documents to be of interest to a user of cloud-based content management platform, each of the subset of word processing or spreadsheet documents being associated with a user account of the user in the cloud-based content management platform, wherein identifying the subset of word processing or spreadsheet documents to be of interest to the user comprises:
determining, by the processor, a set of comments included in word processing or spreadsheet documents associated with the user account of the user, the set of comments including one or more comments added by other users in each word processing or spreadsheet document within a last predetermined time period;
selecting, by the processor, one or more comments from the set of comments included in the word processing or spreadsheet documents, the selecting being based at least on interactions of the user with a comment thread associated with each comment from the set of comments and characteristics of the comment thread, wherein a comment thread is a group of a plurality of comments included in a word processing or spreadsheet document and comprising a first comment and a second comment added in the word processing or spreadsheet document in reply to the first comment; and
identifying, among the word processing or spreadsheet documents associated with the user account of the user, the subset of word processing or spreadsheet documents each including at least one of the one or more selected comments; and
providing, by the processor, a graphical user interface (GUI) of the cloud-based content management platform for presentation to the user, the GUI identifying the subset of word processing or spreadsheet documents and, for each identified word processing or spreadsheet document, a respective selected comment included in the identified word processing or spreadsheet document, and a GUI element allowing the user to request that the identified word processing or spreadsheet document be opened for editing.

2. The method of claim 1, wherein the selecting of the one or more comments from the set of comments comprises:
for each comment in the set of comments:
  determining a comment thread associated with a respective comment;
  determining the interactions of the user with the comment thread; and
  determining the characteristics of the comment thread;
    determining a comment score for the respective comment based on the interactions of the user with the comment thread and the characteristics of the comment thread;
    ranking each comment in the set of comments based on the comment scores; and
    selecting the one or more comments from the set of comments based on rankings.

3. The method of claim 2, wherein the determining of the interactions of the user with the comment thread associated with each comment from the set of comments includes determining at least one of:
whether the user has added an initial comment in the comment thread; or
whether the user has added a comment as a reply to the initial comment or another comment in the comment thread.

4. The method of claim 2, wherein the determining of the characteristics of the comment thread associated with the respective comment includes determining at least one of:
a status of the comment thread, the status including an open status or a close status;
a number of comments included in the comment thread;
a number of different users involved in the comment thread;
a proportion of comments in the comment thread that are added by the user;
a proportion of comments in the comment thread that are added by other users; or
a length of time period the comment thread remained open.

5. The method of claim 2, wherein the determining of the comment score for the respective comment is further based on an importance weight assigned to each user who added the one or more comments; and wherein the importance weight is determined based on an importance of the respective user who generated the one or more comments in a social network associated with the cloud-based content management platform.

6. The method of claim 5, wherein the determining of the comment score for the respective comment based on the interactions of the user with the comment thread, characteristics of the comment thread, and the importance weight assigned to each user who added the one or more comments comprises:
providing the interactions of the user with the comment thread, characteristics of the comment thread, and the importance weight assigned to each user who added the one or more comments as an input to a machine learning model; and
obtaining an output from the machine learning model, the output indicating a probability of the user being interested in the respective comment.

7. The method of claim 1, wherein the determining of the subset of the documents each including at least one of the one or more selected comments comprises:
identifying the word processing or spreadsheet documents, each of the word processing or spreadsheet documents including at least one of the one or more selected comments;
determining a document score for each of the word processing or spreadsheet documents based on the comment scores of the one or more selected comments;
ranking the word processing or spreadsheet documents based on the document scores; and
selecting the subset of word processing or spreadsheet documents based on rankings.

8. The method of claim 7, wherein the determining of the document score for each of the word processing or spreadsheet documents based on the comment scores of the one or more selected comments comprises:
identifying a set of comment threads, each comment thread being associated with at least one of the one or more selected comments;
determining a comment thread score for each comment thread in the set of comment threads based on the comment score of one or more selected comments associated with a respective comment thread; and
determining the document score for each word processing or spreadsheet document based on a comment thread score of one or more comment threads associated with a respective word processing or spreadsheet document.

9. The method of claim 1, wherein the respective selected comment associated with the identified word processing or spreadsheet document corresponds to a most recent comment or a comment with a highest importance score amongst one or more comments included in a respective identified document.

10. The method of claim 1, wherein the GUI comprises one or more suggestion cards, each suggestion card identifying each of the subset of word processing or spreadsheet documents and a respective comment, each suggestion card comprising:
a title information including a document type and a title of a respective word processing or spreadsheet document;
an image representation of the respective word processing or spreadsheet document;
a first intelligent button to reply to the respective comment from a respective suggestion card without opening the respective word processing or spreadsheet document;
a second intelligent button to close the respective comment from the respective suggestion card without opening the respective word processing or spreadsheet document;
a comment text including content of the respective comment; and
a reason text describing a reason for the selection of the respective comment.

11. A system comprising:
a memory device; and
a processing device operatively coupled to the memory device, the processing device to:
identify a subset of word processing or spreadsheet documents to be of interest to a user of cloud-based content management platform, each of the subset of word processing or spreadsheet documents being associated with a user account of the user in the cloud-based content management platform, wherein to identify the subset of word processing or spreadsheet documents to be of interest to the user, the processing device further to:
    determine a set of comments included in word processing or spreadsheet documents associated with the user account of the user, the set of comments including one or more comments added by other users in each word processing or spreadsheet document within a last predetermined time period;
    select one or more comments from the set of comments included in the word processing or spreadsheet documents, the selecting being based at least on interactions of the user with a comment thread associated with each comment from the set of comments and characteristics of the comment thread, wherein a comment thread is a group of a plurality of comments included in a word processing or spreadsheet document and comprising a first comment and a second comment added in the word processing or spreadsheet document in reply to the first comment; and
    identify, among the word processing or spreadsheet documents associated with the user account of the user, the subset of word processing or spreadsheet documents each including at least one of the one or more selected comments; and
provide a graphical user interface (GUI) of the cloud-based content management platform for presentation to the user, the GUI identifying the subset of word processing or spreadsheet documents and, for each identified word processing or spreadsheet document, a respective selected comment included in the identified word processing or spreadsheet document, and a GUI element allowing the user to request that the identified word processing or spreadsheet document be opened for editing.

12. The system of claim 11, wherein to select the one or more comments from the set of comments, the processing device further to:
    for each comment in the set of comments:
        determine a comment thread associated with a respective comment;
        determine the interactions of the user with the comment thread; and
        determine the characteristics of the comment thread;
        determine a comment score for the respective comment based on the interactions of the user with the comment thread and the characteristics of the comment thread;
    rank each comment in the set of comments based on the comment scores; and
    select the one or more comments from the set of comments based on rankings.

13. The system of claim 11, wherein to determine the subset of word processing or spreadsheet documents each including at least one of the one or more selected comments, the processing device further to:
    identify the word processing or spreadsheet documents, each of the word processing or spreadsheet documents including at least one of the one or more selected comments;
    determine a document score for each of the word processing or spreadsheet documents based on the comment scores of the one or more selected comments;
    rank the word processing or spreadsheet documents based on the document scores; and
    select the subset of word processing or spreadsheet documents based on rankings.

14. The system of claim 13, wherein to determine the document score for each of the word processing or spreadsheet documents based on the comment scores of the one or more selected comments, the processing device further to:
    identify a set of comment threads, each comment thread being associated with at least one of the one or more selected comments;
    determine a comment thread score for each comment thread in the set of comment threads based on the comment score of one or more selected comments associated with a respective comment thread; and
    determine the document score for each word processing or spreadsheet document based on a comment thread score of one or more comment threads associated with a respective document.

15. The system of claim 11, wherein the GUI comprises one or more suggestion cards, each suggestion card identifying each of the subset of word processing or spreadsheet documents and a respective comment, each suggestion card comprising:
    a title information including a document type and a title of a respective word processing or spreadsheet document;
    an image representation of the respective word processing or spreadsheet document;
    a first intelligent button to reply to the respective comment from a respective suggestion card without opening the respective word processing or spreadsheet document;
    a second intelligent button to close the respective comment from the respective suggestion card without opening the respective word processing or spreadsheet document;
    a comment text including content of the respective comment; and
    a reason text describing a reason for the selection of the respective comment.

16. A non-transitory, computer readable medium storing instructions that, when executed, cause a processing device to:
    identify a subset of word processing document or spreadsheet documents to be of interest to a user of cloud-based content management platform, each of the subset of documents being a word processing document or a spreadsheet document associated with a user account of the user in the cloud-based content management platform, wherein to identify the subset of word processing or spreadsheet documents to be of interest to the user, the processing device further to:
        determine a set of comments included in word processing document or spreadsheet documents associated with the user account of the user, the set of comments including one or more comments added by other users in each word processing document or spreadsheet document within a last predetermined time period;
        select one or more comments from the set of comments included in the word processing document or spreadsheet documents, the selecting being based at least on interactions of the user with a comment thread associated with each comment from the set of comments and characteristics of the comment thread, wherein a comment thread is a group of a plurality of comments included in a word processing document or spreadsheet document and comprising a first comment and a second comment added in the word processing document or spreadsheet document in reply to the first comment; and identify among the word processing document or spreadsheet documents associated with the user account of the user, the subset of word processing document or spreadsheet documents each including at least one of the one or more selected comments; and provide a graphical user interface (GUI) of the cloud-based content management platform for presentation to the user, the GUI identifying the subset of word processing document or spreadsheet documents and, for each identified word processing document or spreadsheet document, a respective selected comment included in the identified word processing document or spreadsheet document, and a GUI element allowing the user to request that the identified word processing document or spreadsheet document be opened for editing.

17. The computer readable medium of claim 16, wherein to select the one or more comments from the set of comments, the instructions further cause the processing device to:

for each comment in the set of comments:
determine a comment thread associated with a respective comment;
determine the interactions of the user with the comment thread; and
determine the characteristics of the comment thread;
determine a comment score for the respective comment based on the interactions of the user with the comment thread and the characteristics of the comment thread;

rank each comment in the set of comments based on the comment scores; and select the one or more comments from the set of comments based on rankings.

18. The computer readable medium of claim 16, wherein to determine the subset of word processing or spreadsheet documents each including at least one of the one or more selected comments, the processing device further to:

identify the word processing or spreadsheet documents, each of the word processing or spreadsheet documents including at least one of the one or more selected comments;

determine a document score for each of the word processing or spreadsheet documents based on the comment scores of the one or more selected comments;

rank the word processing or spreadsheet documents based on the document scores; and select the subset of word processing or spreadsheet documents based on rankings.

19. The computer readable medium of claim 16, wherein to determine the document score for each of word processing or spreadsheet documents based on the comment scores of the one or more selected comments, the instructions further cause the processing device to:

identify a set of comment threads, each comment thread being associated with at least one of the one or more selected comments;

determine a comment thread score for each comment thread in the set of comment threads based on the comment score of one or more selected comments associated with a respective comment thread; and determine the document score for each document based on a comment thread score of one or more comment threads associated with a respective word processing or spreadsheet document.

20. The computer readable medium of claim 16, wherein the GUI comprises one or more suggestion cards, each suggestion card identifying each of the subset of word processing or spreadsheet documents and a respective comment, each suggestion card comprising:

a title information including a document type and a title of a respective word processing or spreadsheet document;

an image representation of the respective word processing or spreadsheet document;

a first intelligent button to reply to the respective comment from a respective suggestion card without opening the respective word processing or spreadsheet document;

a second intelligent button to close the respective comment from the respective suggestion card without opening the respective word processing or spreadsheet document;

a comment text including content of the respective comment; and a reason text describing a reason for the selection of the respective comment.

21. The method of claim 1, wherein each of the word processing or spreadsheet documents is a collaborative document, wherein the user is one of collaborating users of each of the documents, and wherein the set of comments comprises one or more comments added by other collaborating users in each document of the word processing or spreadsheet documents within a last predetermined time period.

* * * * *